(12) United States Patent
Gerard et al.

(10) Patent No.: US 7,278,439 B2
(45) Date of Patent: Oct. 9, 2007

(54) SYSTEM AND METHOD FOR SEALING A TANK OPENING

(75) Inventors: Yannick Gerard, Kraainem (BE); Stephane Leonard, Bruxelles (BE); Francois Dougnier, Boortmeerbeek (BE)

(73) Assignee: Inergy Automotive Systems Research (Société Anonyme), Brussels (BE)

( * ) Notice: Subject to any disclaimer, the term of this patent is extended or adjusted under 35 U.S.C. 154(b) by 377 days.

(21) Appl. No.: 10/492,529

(22) PCT Filed: Oct. 22, 2002

(86) PCT No.: PCT/EP02/11904

§ 371 (c)(1),
(2), (4) Date: Jun. 2, 2004

(87) PCT Pub. No.: WO03/035423

PCT Pub. Date: May 1, 2003

(65) Prior Publication Data

US 2004/0256587 A1    Dec. 23, 2004

(30) Foreign Application Priority Data

Oct. 24, 2001  (FR) .................................. 01 13931

(51) Int. Cl.
*F16K 24/04* (2006.01)
(52) U.S. Cl. .................... 137/15.01; 137/202; 137/587
(58) Field of Classification Search ................ 137/202, 137/587, 15.01; 220/562, 86.2–86.3, 359.1, 220/359.3, 359.4, 241–242, DIG. 32–33, 220/62.11; 138/98, 99; 53/487, 290, 296; 156/272.8, 94, 308.2, 219, 242, 308.4
See application file for complete search history.

(56) References Cited

U.S. PATENT DOCUMENTS

| 1,704,760 | A | * | 3/1929 | Parker ........................ 138/99 |
| 3,474,775 | A | | 10/1969 | Johnson |
| 3,680,727 | A | * | 8/1972 | Pearson ...................... 220/586 |
| 4,366,972 | A | * | 1/1983 | Franklin ...................... 285/55 |
| 5,020,572 | A | * | 6/1991 | Hunt ........................... 138/99 |
| 5,110,040 | A | * | 5/1992 | Kalberer et al. ........ 229/125.14 |
| 5,732,743 | A | * | 3/1998 | Livesay ...................... 138/99 |
| 6,306,781 | B1 | * | 10/2001 | McGrath .................... 442/149 |
| 6,467,643 | B1 | | 10/2002 | Sadr |
| 6,742,536 | B2 | * | 6/2004 | Mills .......................... 137/202 |

(Continued)

FOREIGN PATENT DOCUMENTS

EP    0 312 045    4/1989

(Continued)

*Primary Examiner*—Eric Keasel
*Assistant Examiner*—Craig M. Schneider
(74) *Attorney, Agent, or Firm*—Oblon, Spivak, McClelland, Maier & Neustadt, P.C.

(57) ABSTRACT

System for closing off an opening in a plastic tank, formed from a sheet of multilayer plastic that includes a barrier layer, the said sheet being welded around the perimeter of the opening and provided with a peripheral region that is slimmed down so as to effectively restrict the permeation of gases and liquids into the layer located between the tank and the barrier layer. Method of closing of a tank by welding such a plate, comprising the welding of the slimmed-down peripheral part by the technique of laser or infrared radiation welding. Use of the method to close off a fuel tank for a motor vehicle.

13 Claims, 1 Drawing Sheet

U.S. PATENT DOCUMENTS

| | | |
|---|---|---|
| 6,843,267 B1 * | 1/2005 | Van Schaftingen et al. . 137/202 |
| 6,915,812 B2 * | 7/2005 | Frohwein .................... 137/202 |
| 7,105,121 B2 | 9/2006 | Sadr |
| 2003/0098062 A1 * | 5/2003 | Engle et al. ................. 137/202 |
| 2005/0067415 A1 * | 3/2005 | Gerard et al. ............ 220/62.11 |

FOREIGN PATENT DOCUMENTS

| | | |
|---|---|---|
| EP | 941 884 | 9/1999 |
| EP | 1 179 445 | 2/2002 |
| FR | 2 576 525 | 8/1986 |
| WO | 01/07806 | 2/2001 |
| WO | 01/21428 | 3/2001 |
| WO | 03/035424 | 5/2003 |

* cited by examiner

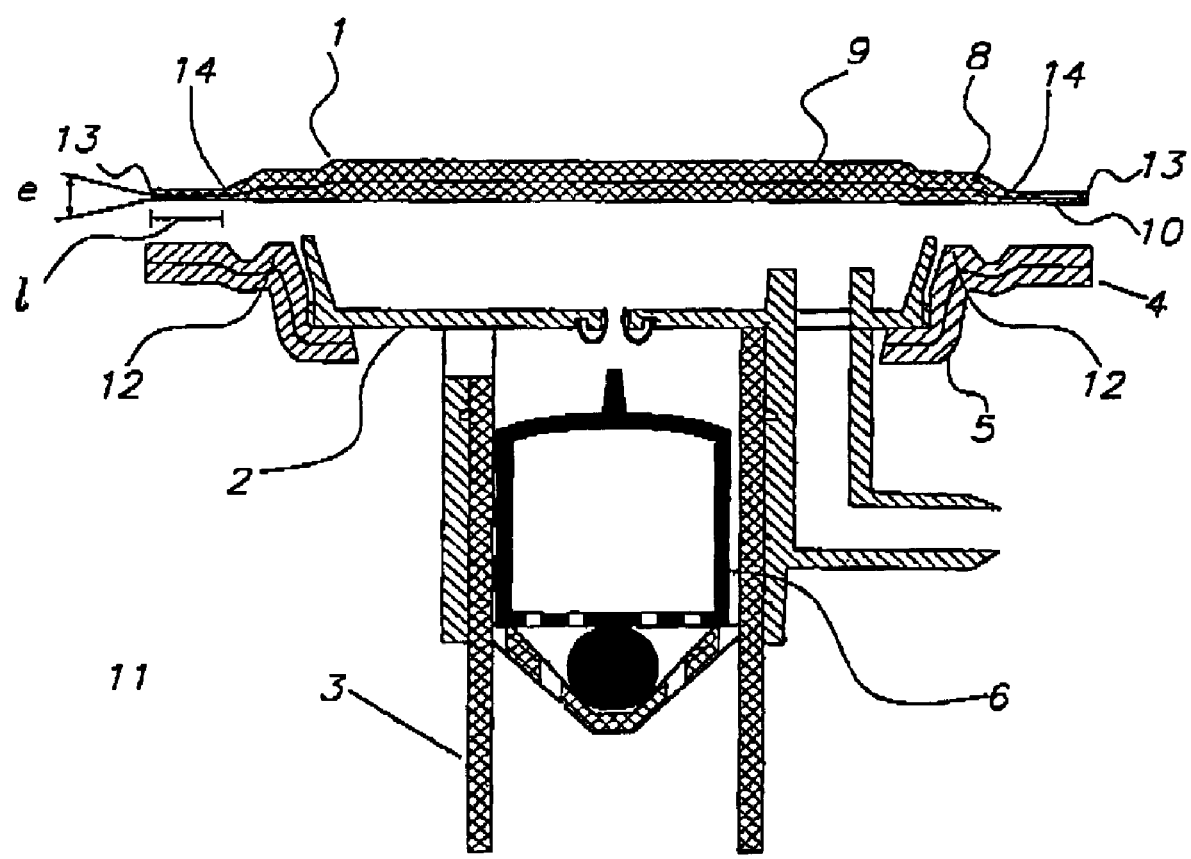

SYSTEM AND METHOD FOR SEALING A TANK OPENING

The present invention relates to a system for closing off an opening in a tank.

Liquid and gas tanks in use in industry or on board vehicles of various kinds must in general satisfy sealing and permeability standards relating to the type of use for which they are designed and the environmental requirements that they must meet. At the present time, both in Europe and in the world, the requirements regarding the limitation of emissions of pollutants into the atmosphere and into the environment in general are being considerably tightened. The design of liquid and gas tanks is consequently undergoing rapid development towards using techniques capable of better guaranteeing sealing and safety under a variety of operating conditions. Moreover, it is also endeavoured to reduce as far as possible any losses arising from the various accessories and pipes associated with the tanks. One means sometimes used has been to incorporate certain accessories and pipes within the tanks, thus eliminating their interfaces with the external atmosphere.

It is known, from Patent Application WO 01/21428 by SOLVAY, to close off an opening in a multilayer fuel tank by means of a multilayer plastic sheet welded to the wall of the tank so as to cover the opening, the layer of plastic of the sheet welded to the tank having a composition compatible with the surface layer of the tank.

In the tank described in that patent application, there remains, however, a fuel permeation channel located between the barrier layer, with which the inside of the multilayer structure of the closure sheets is generally provided, and the wall of the tank, the channel being made of a plastic such as HDPE, the impermeability to fuel of which is not optimal.

The object of the present invention is to provide a system for closing off a tank which further reduces the losses of liquid and gas compared with the known closure systems and makes it possible to achieve loss levels low enough to meet the new environmental standards that are programmed to come into force in the near future both in Europe and the United States.

For this purpose, the invention relates to a system for closing off an opening in a;plastic tank, formed from a plastic sheet welded to the wall of the tank around the perimeter of the opening, the sheet being formed from a multilayer structure that includes a barrier layer, the outer layer of which structure, welded to the tank, has a composition compatible with that of the plastic forming the outer surface of the tank, in which a peripheral region of the sheet, in the weld region, has been slimmed down so as to adapt its geometry according to the following relationship:

$$l/e \geq 5$$

in which l represents the width of the slimmed-down region and e the thickness of the layer in contact with the wall of the tank, both expressed in the same length units.

Preferably, the l/e ratio is at least 8.

The term "tank" is understood to mean a closed chamber, of various shapes, generally sealed with respect to the outside, which may-be equipped with various accessories internal to the chamber or passing through its wall. The tank may be a gas tank, a liquid tank or a tank designed to contain both a gas and a liquid. Preferably, it is a liquid tank or a liquid tank containing also a gaseous phase.

Certain tanks have one or more openings, that is to say cut-outs of circular or other shape, made through the wall of the tank for various purposes, for example so as to be able to introduce one-or more accessories into the tank that cannot be incorporated therein during its manufacture.

Before being able to use the tank for its normal application of storing and confining liquid and gas, it is therefore necessary to design and fit a closure system capable of sealing the tank as hermetically as possible after the accessory has been introduced.

According to the invention, the closure system is designed for plastic tanks. The term "plastic" is understood to mean any synthetic polymeric material, being thermoplastic or thermosetting in the solid state under ambient conditions, and also blends of at least two of these materials. The polymers intended comprise both homopolymers and copolymers (especially binary or ternary copolymers). Examples of such copolymers are, non-limitingly, random copolymers, linear block copolymers, other block copolymers, and graft copolymers. Thermoplastic polymers, including thermoplastic elastomers, are preferred.

The plastic tanks according to the invention are preferably in the form of tanks of multilayer structure. Tanks comprising at least one layer of high-density polyethylene (HDPE) are particularly preferred. Particularly preferred tanks are those in which the structure furthermore includes at least one internal layer made of a barrier material, that is to say a material, generally of polymeric nature, which has a very high impermeability to certain liquids and gases.

For example, it is possible to use known barrier compositions such as those used for making fuel tanks impermeable. Examples of such barrier compositions are, non-limitingly, resins based on polyamides or copolyamides, ethylene/vinyl alcohol random copolymers (EVOH), or even thermotropic liquid-crystal polymers (LCP) such as copolyesters of p-hydroxybenzoic acid with either 6-hydroxy-2-naphthoic acid or terephthalic acid and with 4,4'-biphenol (for example, the copolyesters sold under the brand names VECTRA® and XYDAR®). The term "sheet" is understood to mean any solid element whose thickness is small compared with its area and whose rigidity is close to that of the walls of the tank. According to the invention, the material constituting the sheet comprises a plastic. Preferably, the sheet forming part of the closure system according to the invention is produced exclusively from plastic. The sheet may come in various shapes; usually the shape of the sheet depends on the various types of tank and on the position of the opening in the surface of these tanks that has to be closed off. The sheet often has a plane or slightly curved surface, in particular in the case of small openings such as, for example, circular openings with a diameter not exceeding 80 mm.

According to the invention, the sheet is welded to the wall of the tank around the perimeter of the opening. By this it should be understood that the sheet is fastened to this wall by bringing the molecules of a portion of the surface of one of the two main faces of the sheet adjoining the ends of the latter and forming a junction surface in the form of a closed ring, of circular or any other shape, and to a greater or lesser extent faithfully matching the outer perimeter of this face of the sheet, into contact and partial interpenetration with the molecules of a similar surface of the tank, located around the border of the opening, over its entire perimeter.

According to the invention, the sheet is formed from a multilayer structure, the outer layer of which, welded to the tank, has a composition compatible with that of the plastic forming the outer surface of the tank.

The term "compatibility" is understood here to mean chemical and physical compatibility of the constituents of the respective compositions of the layer of the sheet welded to the tank and of the outer wall of the latter in the region of the opening. Good compatibility prevents the phenomenon of segregation of certain constituents of the respective compositions of the welded parts, and likewise any chemical reaction and physical phenomenon prejudicial to the properties of the tank whose opening is thus closed off. In general, good compatibility ensures long-term adhesion of the sheet to the tank.

One particular preferred system according to the invention is that in which the tank includes, like the sheet, a barrier layer impermeable to liquids and gases. The barrier layers of the sheet and of the tank may be identical or different. In general, it is preferred for these barrier layers to be identical, particularly when they comprise identical barrier compositions.

These barrier compositions may be incorporated into one of the layers of the sheet or a special additional layer essentially consisting of a barrier composition may be inserted into the structure. Preferably, an additional layer essentially consisting of a barrier composition is inserted into the structure.

When the tank has a multilayer structure, the multilayer structure of the sheet may be different from that of the walls of the tank itself, but may also be identical thereto. Closure systems in which the structure of the sheet is identical to that of the walls of the tank are often preferred. Most particularly preferred are systems in which, within identical structures, the barrier compositions themselves are identical and constitute identical polymeric layers.

As a variant, the multilayer structure of the sheet may also comprise two different barrier layers. A preferred example according to this variant is that of sheets having two complete structures identical to that of the walls of the tank, stacked one on top of the other and resulting from the compression of two structures identical to the walls of the tank.

Another variant consists in producing, near the edge of the sheet, an embossment in which the thicknesses of the layers are reduced, in particular those of the layers other than the barrier layer. The benefit is in this case to further limit the risk of loss by transmission at the point where the sheet is welded to the tank.

The expression "outer layer of the sheet" is understood to mean a layer one of whose faces is adjacent to another layer of the sheet and whose other face is in contact with the environment external to this sheet.

The system according to the invention is very suitable for closing off a simple opening in a tank. It is also suitable for closing off an opening above an accessory located in the tank.

According to one particularly preferred embodiment of the closure system according to the invention, the sheet is fastened to at least one accessory located on the inside of the tank. The term "accessory" is understood to mean in general any member via which liquid or gas passes, or one in contact with liquid or gas, and which fulfils a particular function specific to the device of which the tank forms part, including a function of transporting liquid and/or gas between two other members.

Examples of such accessories comprise, not limitingly, the following:

a container that contains any chemical or physical composition, especially a vapour absorption canister;

a liquid or gas gauge;

a electrical connection terminating in a liquid or gas gauge;

a liquid or gas pump;

a safety valve for controlled closure of the tank under certain special conditions;

a drainable container for receiving liquid;

an electrical connection for supplying the motor of a liquid or gas pump;

a liquid pipe terminating in a supply device for any device, especially an engine;

a liquid/vapour separation device.

Any combination of at least two accessories may be used, optionally in the presence of several examples of the same accessory.

According to this embodiment, the accessory is fastened to the sheet, that is to say it is linked to the sheet by a mechanical means. The accessory is fixed to the sheet by any mechanical means compatible with the type of tank, the nature of the liquid and the gas that are stored therein and the normal usage to which the tank is put. The sheet may provide a means of gripping and transporting the accessory. For example, it is possible to use a sheet to which the accessory is fixed by a mechanical fixing device. Such devices are, for example, screws, bolts, nuts, clip systems, etc. It is also possible to use a sheet and an accessory that have been fastened together right from their manufacture, for example by moulding. It is also possible to make use of a fastening means with a more permanent character, such as adhesive bonding or welding. In general, it is preferred for the accessories to be fastened to the sheet by welding.

The accessory fastened to the sheet is present with respect to the latter on that face of the sheet which is on the inside of the tank when the closure has been made.

Accessories of various types fall within this embodiment. As examples, mention may be made of ROV (Roll-Over Valve) valves, i.e. valves that will automatically close in the event of the tank turning upside down, ORVR (On-board Refuelling Vapour Recovery) valves, i.e. devices for vapour recovery when refuelling the tank, and OBD (On-Board Diagnostic) devices, and liquid/vapour separators.

Some of these accessories may include at least one pipe passing through the sheet via an orifice drilled in the latter. It is often advantageous in this case to provide the outlet orifice of the pipe with a seal.

The sheet may also have been formed so as to be tailored as far as possible to the surroundings of the opening to be closed off and to the shape and size of the accessory to which it is fastened.

A sheet fastened to a liquid-vapour separator that includes a vapour discharge pipe passing through the sheet via an orifice has given good results.

One particular closure system consists in using a tank having a wall that bears fixing lugs near the opening. These allow the wall to be supported during the welding operation, should this wall undergo flexible deformation.

The invention also relates to a method of closing off an opening in a plastic tank by means of a plastic sheet of multilayer structure, the outer layer of which, welded to the wall of the tank around the perimeter of the opening, has a composition compatible with that of the plastic forming the outer surface of the tank, in which a peripheral region of the sheet is slimmed down, before welding, so as to adapt its geometry according to the following relationship:

$$l/e \geq 5$$

in which l represents the width of the slimmed-down region and e its thickness, both expressed in the same length units.

In this method, the specific terms and expressions that are common, such as tank, opening, closure, plastic, multilayer structure, sheet, welding, around the perimeter of the opening, compatible composition, have exactly the same meanings as those mentioned above in the case of the closure system.

The sheet used in this method may have come from various sources. For example, it may have been manufactured independently of the tank itself, possibly at a different time, by means of a specific process that is not necessarily identical to that used to manufacture the tank. For example, the sheet may be obtained by coextrusion, optionally followed by compression moulding. It may also have been obtained by moulding using one of the many known techniques. Such techniques are, for example, blow moulding, compression moulding, injection moulding and thermoforming.

When the sheet is manufactured independently of the tank, an opening is made in the tank with dimensions that are slightly smaller than those of the sheet, and then the opening is closed off by welding the sheet.

As a variant, the sheet may have been manufactured at the same time as the tank and cut from the plastic of multilayer structure used to manufacture the tank. This procedure is particularly advantageous from the standpoint of synchronising the production of tanks fitted with their accessories. It is possible, for example, to cut out the sheet directly from a region of the wall of the tank, after the latter or part of it has been produced. This variant assumes that the innermost outer layer of the multilayer structure of the tank is compatible with its outermost layer.

Another variant is to cut out the sheet from tank manufacturing scrap, provided that this has the appropriate multilayer structure.

It is also possible to cut out the sheet from an ancillary part of the tank specially designed for this purpose and produced simultaneously with it.

Finally, it is also possible to manufacture sheets comprising two complete structures identical to the structure of the walls of the tank, by pressing together two structures identical to the walls of the tank. In this case, it is possible, for example, to compress a particular part of the parison used for producing the tank. To do this, it is most particularly advantageous for the two identical structures of the sheet to be compressed using the same production mould as for the tank.

Any suitable technique may be used to produce the slimmed-down peripheral region of the sheet. Techniques that are well suited are forming techniques such as thermoforming and extrusion-compression moulding.

The operation of welding the sheet to the tank may be carried out by any technique generally known per se. For example, it is possible to use the hot-plate welding technique or the laser welding technique. The hot-plate welding technique is preferred. The technique of welding the plate to the tank may be different from that of the slimmed-down peripheral region of this sheet.

According to the invention, the slimmed-down part of the sheet is welded by a laser radiation or infrared radiation welding technique.

According to a preferred way of implementing the method according to the invention, a composition opaque to the laser radiation or to the infrared radiation is incorporated into the plastic layer of the slimmed-down region in contact with the outer surface of the tank.

Advantageously, this method of implementation produces tanks in which the welding by laser or infrared radiation of the slimmed-down peripheral region of the sheet is of better quality. The expression "composition opaque to laser or infrared radiation" is understood to mean a composition that absorbs and/or reflects a substantial proportion of the laser or infrared radiation energy. An example of such a composition that has given good results is a carbon black filler. This composition is advantageously distributed uniformly throughout the polymeric material of the layer directly in contact with the wall of the tank.

According to one particular version of the method according to the invention, at least one accessory is fastened to the sheet, on the inside of the tank. Any fastening method compatible with the tank, the nature of the liquid and the gas that it contains, and with its operating conditions may in general be suitable.

However, it is preferred to use a welding process to carry out this fastening operation.

Here again, the terms and expressions "fastening" and "inside of the tank" have the same meaning as already explained above in the case of the closure system.

In this particular way of implementing the method according to the invention, a first variant consists in welding at least one accessory to the sheet before the opening in the tank is closed off by welding the sheet fastened to the accessory around the perimeter of this opening.

In this way, the sheet acts as support for the accessory and allows it to be easily introduced into the tank.

A second variant consists, in contrast, in fastening, in a first step, at least one accessory to the internal wall of the tank that is adjacent to the opening and, in a subsequent second step, in closing off the tank by simultaneously welding the sheet to the accessory and to the perimeter of the opening.

In one or other of the methods of implementation employed, one problem may arise when carrying out the operation of welding the sheet to the wall of the tank when this wall undergoes, for any reason, flexible deformation near the opening, for example owing to the effect of its own weight, as a result of forces exerted perpendicular to the surface of the tank during welding. A similar situation may in fact arise when the tank comes directly from manufacture and when the temperature of its walls is still relatively high. Another reason could be that the diameter of the opening is relatively large and that the plastic near the edge of the opening is no longer supported as effectively as in the case of small openings.

The invention also relates to a closure method that remedies these problems of flexible deformation of the tank wall, by supporting the tank wall in the region of the opening during the operation of welding the sheet by means of lugs moulded to this wall.

The lugs are moulded to the outer wall of the tank near the perimeter of the opening. The wall of the tank is supported at this point by means of clamps that grip the lugs.

Lugs similar to those described above may also be used when the sheet is being cut out from the wall of the tank, so as to prevent this wall from deforming.

The lugs may also be used, before the welding operation, to correct a lack of flatness that may occur on the surface of the tank.

Finally, they may also help to bring the shape of the outer surface of the tank into perfect correspondence with that of the sheet.

The invention also relates to the use of the method described above to close off an opening in a fuel tank, particularly for a motor vehicle.

The term "motor vehicle" is understood to mean vehicles powered by an internal combustion engine such as lorries, cars and motorcycles.

The FIGURE that follows is given for the purpose of illustrating the invention, without wishing to restrict its scope.

The FIGURE shows a tank (11), the wall of which is formed from a multilayer structure comprising an EVOH barrier layer surrounded by two HDPE layers. The barrier layer is fastened to the HDPE layers via a thin interlayer of 80 μm of an adhesive made of a maleic-anhydride-grafted polyethylene of the ADMER® L2100 trade mark from Mitsui. The multilayer structure of the wall of the tank (11) has an opening into which a siphon (2) has been snap-fastened onto the rim (5) of the wall (4) of the tank (11). A venting ROV valve having a float (6), and provided with a polyacetal skirt (3), was fixed to the siphon (2), again by snap-fastening.

A sheet (1), of multilayer structure comprising an EVOH barrier layer (9), a HDPE layer (8) and a layer (10) made of a HDPE filled with 0.2% by weight of carbon black, was moulded by thermoforming so as to obtain a slimmed-down profile around a peripheral region (13), (14) with a width (l) of 10 mm until a thickness (e) of 0.8 mm was obtained in the case of the layer of carbon-black-filled HDPE. This sheet (1) was welded to the outer surface (12) of the tank by hot-plate welding, the carbon-black-filled layer (10) being placed in contact with the wall of the tank (11). The slimmed-down peripheral region (13) (14) of the sheet (1) was then welded by a laser beam being scanned over the outer parts of the tank adjoining the hot-plate-welded region (12). The laser employed was a FAP-type YAG diode laser with a wavelength of 809 nm and a power of 35 W, used in pulsed mode.

The invention claimed is:

1. A method of closing off an opening in a tank, said method comprising:
   providing a tank defining said opening and having an outer layer of plastic;
   providing a plastic sheet of multilayer structure having an outer layer with a composition compatible with that of said plastic of said outer layer of said tank;
   slimming down a peripheral region of said plastic sheet according to the following relationship:

$l/e \geq 5$ in which 1 represents a width of the slimmed-down peripheral region and e a thickness of a layer of the plastic sheet configured to contact the wall of the tank, both expressed in a same length unit; and
   after said slimming down, welding said plastic sheet to said tank,
   wherein said welding comprises:
       hot-plate welding a non-slimmed-down portion of the plastic sheet to said tank, and
       laser beam welding said slimmed-down peripheral region to said tank.

2. The method according to claim 1, further comprising forming the tank from a multilayer structure.

3. The system method according to claim 2, further comprising forming the tank and the sheet from the same multilayer structure.

4. The method according to claim 1, wherein the l/e ratio is at least 8.

5. The method according to claim 1, further comprising fastening the sheet to at least one accessory located on the inside of the tank.

6. The method according to claim 1, further comprising incorporating a composition opaque to laser radiation into the slimmed-down peripheral region.

7. The method according to claim 1, wherein the peripheral region of the sheet is slimmed down using a process chosen from thermoforming and extrusion-compression moulding.

8. The method according to claim 1, wherein said tank is a fuel tank for a motor vehicle.

9. The method according to claim 1, wherein the layer of the plastic sheet in contact with the wall of the tank is flat in the slimmed down region.

10. The method according to claim 1, wherein the layer of the plastic sheet in contact with the tank includes a high density polyethelyne filled with 0.2% by weight of carbon black.

11. The method according to claim 1, wherein the multilayer structure of said plastic sheet further comprises a barrier layer that includes ethylene/vinyl alcohol random copolymers.

12. The method according to claim 1, wherein the multilayer structure of said plastic sheet further comprises a barrier layer includes resins based on polyamides or copolyamides.

13. The method according to claim 1, wherein the multilayer structure of said plastic sheet further comprises a barrier layer includes thermotropic liquid-crystal polymers.

* * * * *

UNITED STATES PATENT AND TRADEMARK OFFICE
CERTIFICATE OF CORRECTION

PATENT NO. : 7,278,439 B2  Page 1 of 1
APPLICATION NO. : 10/492529
DATED : October 9, 2007
INVENTOR(S) : Yannick Gerard et al.

It is certified that error appears in the above-identified patent and that said Letters Patent is hereby corrected as shown below:

Column 8, line 45, please insert --that-- after "layer".

Column 8, line 49, please insert --that-- after "layer".

Signed and Sealed this

First Day of July, 2008

JON W. DUDAS
*Director of the United States Patent and Trademark Office*